INVENTOR.
Paul R. Pittman, Jr.
BY
Milton E. Gilbert

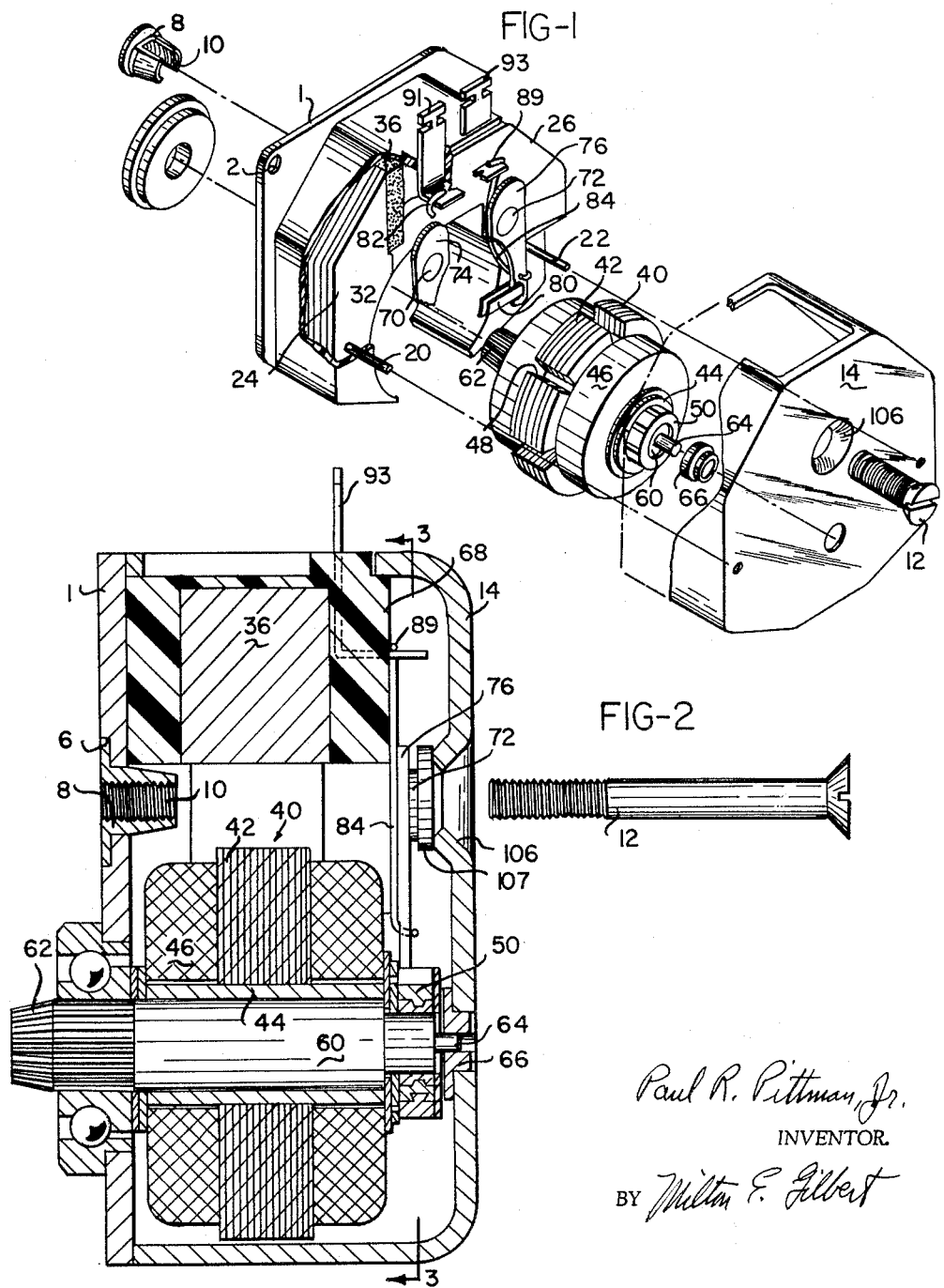

United States Patent Office 3,173,044
Patented Mar. 9, 1965

3,173,044
PERMANENT MAGNET MOTOR
Paul R. Pittman, Jr., Dayton, Ohio, assignor to Globe Industries, Inc., Dayton, Ohio, a corporation of Ohio
Filed Sept. 5, 1962, Ser. No. 221,527
5 Claims. (Cl. 310—154)

The present invention relates to a miniature electric D.C. motor, and is more particularly directed to an encased D.C. molded motor.

It is one object of the invention to provide an encased D.C. molded motor of highly economical construction and of short axial length. It is a further object of the invention to provide a molded D.C. permanent magnet motor in which means are provided for supporting the brushes and terminals. It is a further object of the invention to provide a miniature D.C. molded permanent magnet motor which can be readily repaired and adjusted.

These and further objects of the invention will become more readily apparent upon a reading of the description following hereinafter, and upon an examination of the drawings, in which:

FIGURE 1 is an exploded perspective view of the miniature electric D.C. permanent magnet motor of the invention;

FIGURE 2 is a cross-sectional view taken through the center of the motor of the invention;

Figure 3:
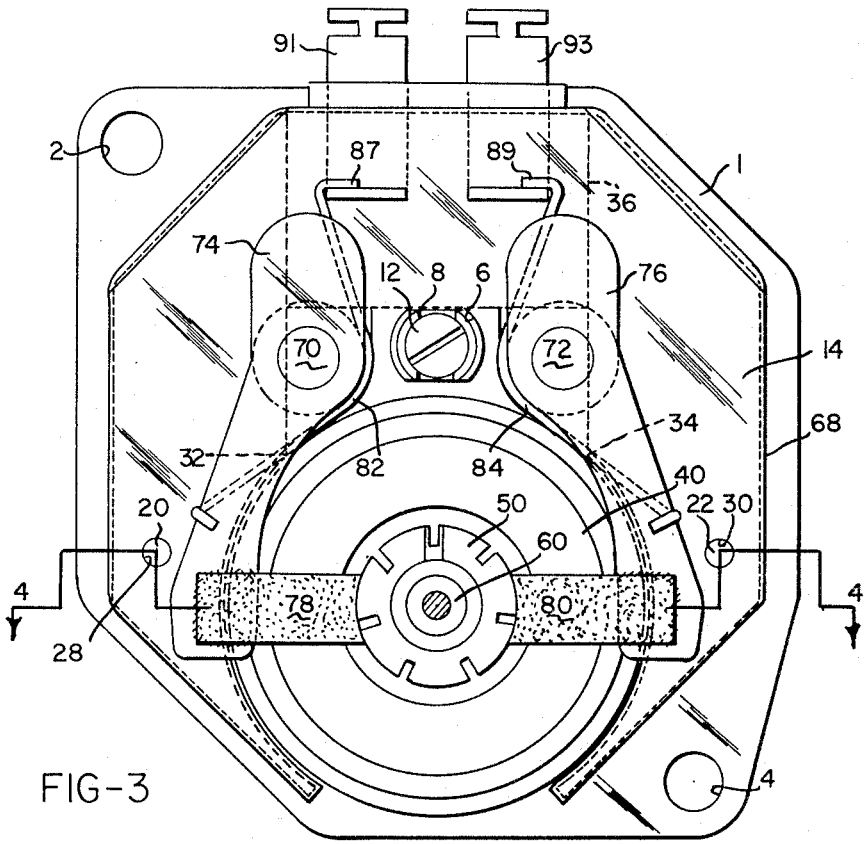
FIGURE 3 is a view, partially in cross-section, taken along line 3—3 of FIGURE 2.

As shown in the drawings a base or mounting plate 1 is provided with a pair of mounting holes 2 and 4 by means of which the motor may be mounted into other apparatus. A substantially rectangular opening 6 is provided in the plate 1 to receive a nut-like member 8 which is retained in the opening 6 because of its spring-like configuration. This nut 8 is internally threaded as at 10 to receive the screw 12 which secures the cover plate 14 to the assembled motor by threading it through the threads 10.

A pair of holes 16 and 18 are further provided in the mounting plate 1 to receive studs or pins 20 and 22, respectively. These studs 20 and 22 serve as a positioning and mounting means for the series of laminations 24 and 26 which are pressed thereon. Each lamination is provided with a hole 28 and 30 through which the pins project. The inner surface of the laminations may be offset as at 32 and 34 in order to provide a seating and locating means for the magnet 36. The magnet is preferably of Alnico V composition and may be cadmium plated in order to form a better bond during the molding process and to meet the stringent requirements of military specifications. The assembly of the magnet plus the pole pieces therefore is of horseshoe configuration to surround the rotor 40.

The rotor 40 is of generally conventional configuration and comprises a stack of laminations 42 mounted upon a tube 44 with a series of windings 46 flowing through and around slots 48 in the laminations 42. The leads of the coils 46 are connected to a commutator 50 which is shown as a seven bar commutator in FIGURE 3, but which may be of any desired number of bars. Since the motor is of compact configuration and of short axial length, the commutator 50 may be slotted separately and then assembled adjacent to the winding so that the leads from the winding may be attached to the commutator bars. The armature 40 and its adjacent commutator 50 are mounted upon an armature shaft 60 which has a gear 62 cut into one end thereof, and is formed with a small pilot diameter 64 at the other end thereof which rotates within a sleeve bearing 66. The sleeve bearing may preferably be of an anti-friction plastic material.

Figure 4:
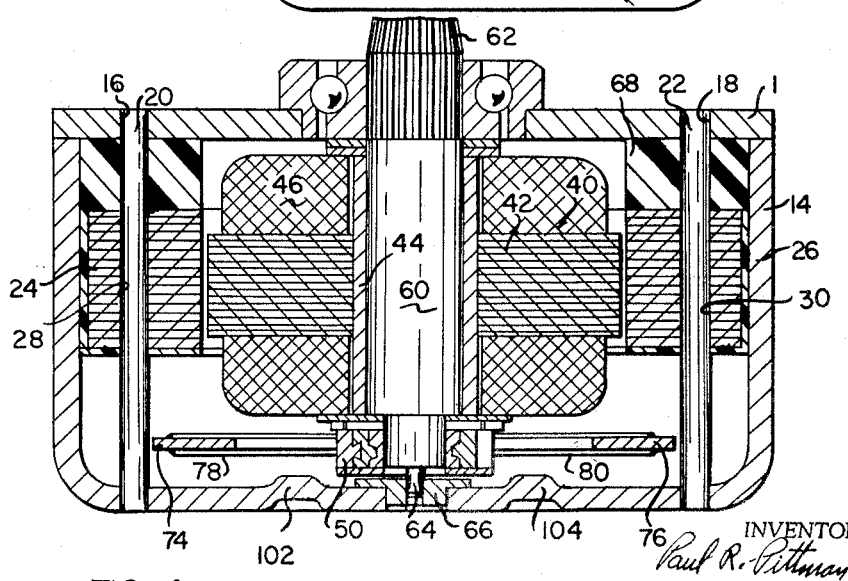
FIGURE 4 is a cross-sectional view taken along line 4—4 of FIGURE 3.

The field structure formed by the poles 24, 26 and magnet 36 are supported from the plate 1 by a potting compound 68 which completely surrounds these elements and spaces them from the mounting plate 1, as clearly shown in FIGURES 1, 2 and 4. This potting compound is so molded as to provide a pair of mounting bosses 70 and 72. These bosses form a support for the brush holder arms 74 and 76 which have a pair of brushes 78 and 80 soldered to their lower extremities, respectively. These brush arms 74 and 76 are provided with holes so that they can be mounted over the bosses 70 and 72 and pivot thereon. The pivot arms 74 and 76 also are spring loaded as by the springs 82 and 84, which springs also act as brush shunts. The brush arms are retained upon the bosses by a cupped shape cover 14 which is provided with dimpled areas 102 and 104, which serve as guides for the brush arms to prevent their sliding off of the bosses 70 and 72 during vibration. The cup shaped cover 14 completely encloses the motor and thus provides a sealed environment therefor, and is retained in position by the screw 12 which passes through a dimpled opening 106 and is threaded into the fitting 8 as previously described.

The springs 82 and 84 are formed at one end with the hooked portions 83 and 85 to bear against the respective arms 74 and 76. The springs are curved around the bosses 70 and 72 and terminate at their opposite ends in bent over portions 87 and 89, which bear against upturned tabs of the terminals 91 and 93, respectively. These terminals 91 and 93 are retained in position by the molding or potting compound 68 to form a firm anchor for the spring. Insulating washers 107 are provided above the brush to insulate same from the cover 14.

It is thus seen from the above description that there is provided a molded motor relatively simple in configuration, which may be mounted in a sealed container to withstand environmental conditions as required by military and space applications and which can be disassembled and repaired without disturbing the molded portion thereof. It is to be readily understood that various modifications and rearrangement of parts may be made without departing from the scope of the invention defined in the annexed claims.

What is claimed is:

1. A miniature permanent magnet motor comprising in combination:

a stator structure including a magnetic field unit comprising a permanent magnet and pole pieces juxtaposed thereto accurately formed so as to operatively cooperate with a rotor structure having commutator means thereon, said stator structure being substantially encased in a plastic molded construction which provides a pair of guide bosses;

brush means removably mounted upon said bosses, the latter serving to locate and position said brush means, said brush means cooperating with said commutator means in the motor current switching function to enable unidirectional rotation of said rotor;

and a readily removable cover means for said motor so constructed and arranged with respect to said bosses as to provide a means to retain said brushes in position upon said bosses.

2. A stator structure for a miniature permanent magnet motor comprising a mounting guide plate, guide pin means affixed to said guide plate, pole pieces mounted on said guide pins in spaced relationship from said plate, a permanent magnet operatively arranged with respect to said pole pieces, and a molded insulating plastic mass bonding said pole pieces and magnet in spaced relationship to said mounting plate and enshrouding said stator structure.

3. The miniature motor of claim 1 wherein said stator construction comprises a mounting guide plate, guide pin means affixed to said guide plate, pole pieces mounted on said guide pins in spaced relationship from said plate, a permanent magnet operatively arranged with respect to said pole pieces, and a molded insulating plastic mass bonding said pole pieces and magnet in spaced relationship to said mounting plate and enshrouding said stator structure.

4. The miniature motor of claim 3 wherein said molded construction includes terminal means, and said brush means includes arms pivotally mounted upon said bosses, carrying brushes at one end thereof.

5. The miniature motor of claim 4 including spring means extending from the arms to the terminal means for shunting said brush means.

References Cited by the Examiner
UNITED STATES PATENTS

| | | | |
|---|---|---|---|
| 2,453,101 | 11/48 | Schulz | 310—154 |
| 2,465,446 | 3/49 | Gorfin et al. | 310—154 |

MILTON O. HIRSHFIELD, *Primary Examiner.*